UNITED STATES PATENT OFFICE

RICHARD HART, OF GLOVERSVILLE, NEW YORK, ASSIGNOR OF ONE HALF HIS RIGHT TO JAMES GILLESPIE, OF SAME PLACE.

IMPROVEMENT IN PROCESSES OF DRESSING SKINS.

Specification forming part of Letters Patent No. 169,102, dated October 26, 1875; application filed July 24, 1875.

*To all whom it may concern:*

Be it known that I, RICHARD HART, of Gloversville, Fulton county, and State of New York, have invented an Improved Process of Dressing Skins, of which the following is a specification:

My invention relates to dressing skins, and especially what are known as "sheep-skin fleshers;" and consists in immersing the skins, first, in a fluid mixture of alum, flour or oatmeal, or both, and oil and water, in the proportions and prepared as hereinafter particularly named and described, and, after a suitable period, in a fluid mixture of urine, soap, soda, salt, whiting, flour or oatmeal, or both, and water, in the proportions and prepared as hereinafter stated, the skins being manipulated, meanwhile, as hereinafter set forth, whereby the skins, when thus dressed, are made stronger and more pliable, and have more elasticity or "spread," and are given a higher susceptibility of finish, and may be faced or finished on either or both sides.

In carrying out my process I first immerse and pound and stir the skins for about one-half hour in a fluid mixture, which I prepare as follows: I dissolve one pound of alum in about one and a half gallon of water, which I find is most readily done by boiling. I then mix, in a separate vessel, about one-half pound each of flour and oatmeal, or one pound of either alone, with one gill of oil and one and a half gallon of water, and mix this composition with the alum-water in a suitable receptacle. At the expiration of the designated time I take the skins out of this mixture and stretch them, and remove the groundwork and knife-marks from the grain side. I then immerse them for about the same length of time, and with the same manipulations as before, in a fluid mixture, which I prepare as follows: One gill of urine, one-half bar of bar-soap, one-half ounce of soda, one-half pound of salt, and about two ounces of whiting or ocher, all boiled in one and a half gallon of water until they are thoroughly dissolved, to which are added one-half pound of flour and one-half pound of oatmeal, or one pound of either alone, mixed in one and a half gallon of cold water. The skins are then dried, stretched, and staked out, and can now be faced or finished upon either side in the usual manner.

Instead of urine in the mixture last described, ammonia may be used, as I find it produces the same effect; or the proportion of soda may be suitably increased, and neither urine nor ammonia be employed, and still the desired result obtained.

In both of the mixtures I prefer to employ the ingredients of both the flour and oatmeal in the proportions named; but either may be employed alone in double proportion, as I have specified, and the effect not be perceptibly changed.

I do not wish to confine myself to the exact quantities or proportions of any of the ingredients of either of the mixtures, as herein named, as, without departing from the spirit of my invention, they may be altered to suit the conditions and quality of the skins to be dressed.

The quantity of the mixtures I have herein specified is sufficient to treat about two dozen sheep-skin fleshers of the ordinary size at one time.

Skins dressed by the usual method can be finished or faced on the flesh side only, and always have a rough and hard surface on the grain or unfinished side, besides being rough and stiff in texture.

Skins dressed by my process, by treatment to both mixtures, as herein set forth, may be finished on either or both sides, and are made soft, pliable, and with elasticity or "spread," and stronger in texture, without becoming rough.

Skins which are treated to the first mixture only, as herein described, may be at once dried, staked, and stretched, and finished on either or both sides, in the usual manner, without subjecting them to the second mixture, and will be then better in quality, and have a susceptibility of better finish, than skins dressed in the ordinary way; but I prefer to employ the entire process herein described in dressing skins, as they are thus given a superior quality and a capacity for higher finish than when the first part of the process only is used, and, when finished, bear a close resemblance, in texture and quality, to deer-skin or castor.

What I claim as my invention, and desire to secure by Letters Patent, is—

The improved process for dressing skins, consisting in the application to the skins of the two solutions composed of the ingredients named, in about the proportions stated, substantially in the manner and in the order specified.

RICHARD HART.

Witnesses:
　JAMES M. DUDLEY,
　PHILIP KECK.